(12) United States Patent
Yang

(10) Patent No.: US 11,842,015 B2
(45) Date of Patent: Dec. 12, 2023

(54) HOLOGRAM TOUCH DISPLAY DEVICE AND HOLOGRAM TOUCH GESTURE CONTROL METHOD

(71) Applicant: MARKETON INC., Seoul (KR)

(72) Inventor: Chang-Joon Yang, Seoul (KR)

(73) Assignee: MARKETON INC., Seoul (KR)

( * ) Notice: Subject to any disclaimer, the term of this patent is extended or adjusted under 35 U.S.C. 154(b) by 0 days.

(21) Appl. No.: 17/827,814

(22) Filed: May 30, 2022

(65) Prior Publication Data
US 2022/0391037 A1 Dec. 8, 2022

(30) Foreign Application Priority Data
Jun. 2, 2021 (KR) .................. 10-2021-0071686

(51) Int. Cl.
*G06F 3/042* (2006.01)
*G06F 3/01* (2006.01)
*G03H 1/00* (2006.01)

(52) U.S. Cl.
CPC ......... *G06F 3/0426* (2013.01); *G03H 1/0005* (2013.01); *G06F 3/017* (2013.01); *G06F 3/0421* (2013.01)

(58) Field of Classification Search
CPC ...... G06F 3/0426; G06F 3/017; G06F 3/0421; G03H 1/0005
USPC ........................................................ 715/773
See application file for complete search history.

(56) References Cited

U.S. PATENT DOCUMENTS

| | | | |
|---|---|---|---|
| 10,275,098 B1* | 4/2019 | Clements | G02B 30/56 |
| 10,323,935 B1* | 6/2019 | Merle | G01B 9/02015 |
| 2008/0291156 A1* | 11/2008 | Dietz | H03K 17/941 345/156 |
| 2016/0018985 A1* | 1/2016 | Bennet | G09G 3/002 345/175 |
| 2018/0176506 A1* | 6/2018 | McNelley | H04N 7/142 |

FOREIGN PATENT DOCUMENTS

| | | |
|---|---|---|
| KR | 10-2011-0045686 A | 5/2011 |
| KR | 10-2013-0115558 A | 10/2013 |
| KR | 10-2018-0126707 A | 11/2018 |
| KR | 10-1982396 B1 | 5/2019 |

(Continued)

OTHER PUBLICATIONS

KR10-2021-0071686 1st Office Action dated Sep. 23, 2021.

(Continued)

*Primary Examiner* — Sherrod L Keaton

(57) ABSTRACT

Provided are a hologram touch display device and a hologram touch gesture control method. A hologram touch display device according to an embodiment of the present disclosure includes: a space projector configured to project a keypad hologram having a plurality of key buttons in air; a touch recognition part configured to emit light to the keypad hologram, receive the light reflected by a touch gesture of a user at the keypad hologram to detect a touch position of the user with respect to the keypad hologram, and determine keypad touch information of the user according to the touch position; and a touch controller configured to perform control such that an external device connected over a network operates on the basis of the keypad touch information.

8 Claims, 12 Drawing Sheets

(56) References Cited

FOREIGN PATENT DOCUMENTS

KR    102342536  B1    12/2021

OTHER PUBLICATIONS

KR10-2021-0071686 Notice of Allowance dated Dec. 8, 2021.
PCT/KR2022/007385 Search Report dated Aug. 31, 2022.
Ahn, Ho Cheon, Marketon, hologram-based COVID-19 quarantine product 'HST' unveiled, ETNews, Oct. 28, 2020.
PCT/KR2022/007385 Written Opinion dated Aug. 31, 2022.

* cited by examiner

HOLOGRAM TOUCH DISPLAY DEVICE AND HOLOGRAM TOUCH GESTURE CONTROL METHOD

CROSS REFERENCE TO RELATED APPLICATION

The present application claims priority to Korean Patent Application No. 10-2021-0071686, filed Jun. 2, 2021, the entire contents of which is incorporated herein for all purposes by this reference.

BACKGROUND OF THE INVENTION

Field of the Invention

The present disclosure relates to a hologram touch display device and a hologram touch gesture control method.

Description of the Related Art

Modern people touch and come into contact with countless buttons to operate various devices, such as elevators, kiosks, automated teller machines (ATMs), etc., in daily life. However, there is a risk of infection with viruses due to physical contact for operating buttons, and damage to buttons may occur.

In particular, in order to avoid direct physical contact with elevator buttons because of a recent rapid increase in the risk of infection with COVID-19, it is common that buttons are covered by vinyl, or users press buttons with objects rather than their fingers.

Accordingly, there is a need for a method enabling operation of a button without directly physically touching a public device.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) U.S. Pat. No. 10,275,098 (registered, 30 Apr. 2019);
(Patent Document 2) International Patent Publication No. WO 2005/113399 (published, 1 Dec. 2005); and
(Patent Document 3) U.S. Pat. No. 9,766,775 (registered, 19 Sep. 2017).

SUMMARY OF THE INVENTION

The present disclosure is directed to providing a hologram touch display device and a hologram touch gesture control method enabling use without direct contact with a keypad of a device.

It is to be understood that technical problems to be solved by the present disclosure are not limited to the aforementioned technical problems and other technical problems which are not mentioned will be apparent from the following description to those skilled in the art.

According to an embodiment of the present disclosure, there is provided a hologram touch display device including: a space projector configured to project a keypad hologram having a plurality of key buttons in air; a touch recognition part configured to emit light to the keypad hologram, receive the light reflected by a touch gesture of a user at the keypad hologram to detect a touch position of the user with respect to the keypad hologram, and determine keypad touch information of the user according to the touch position; and a touch controller configured to perform control such that an external device connected over a network operates on the basis of the keypad touch information.

In addition, the space projector may be configured to project the keypad hologram to a first region pre-defined on the basis of a 3D coordinate system.

In addition, the touch recognition part may be configured to determine the keypad touch information by detecting the touch position based on the touch gesture of the user within a second region pre-defined on the basis of the 3D coordinate system corresponding to the plurality of key buttons.

In addition, when the user's hand moves in a first direction toward the keypad hologram to make a first touch gesture at a particular point within the second region and moves in a second direction opposite to the first direction to make a second touch gesture at the particular point, the touch recognition part may be configured to detect the key button corresponding to the particular point as the touch position of the user and determine the keypad touch information, and the touch controller may be configured to control the space projector such that the key button corresponding to the particular point determined as the keypad touch information is displayed in an emphasized manner.

In addition, the touch recognition part may include: a light-emitting module configured to emit incident light perpendicular to the keypad hologram; a light-receiving module configured to receive reflected light reflecting off the keypad hologram by the touch gesture of the user; and an operation module configured to detect the touch position of the user on the basis of the incident light and the reflected light, and compute the keypad touch information.

In addition, the touch recognition part may include: the light-emitting module including a plurality of light emitters, and the light-receiving module including a plurality of light receivers; and a sensor array in which unit sensor modules each composed of one of the light emitters and one of the light receivers are arranged corresponding to the plurality of key buttons.

In addition, the hologram touch display device may further include a touch communication part configured to communicate with the external device.

In addition, the touch controller may be configured to generate a control signal according to the keypad touch information and transmit the control signal to the external device through the touch communication part.

In addition, the hologram touch display device may further include a housing for arranging the space projector, the touch recognition part, and the touch controller.

In addition, the housing may include: a main panel for arranging the space projector, the touch recognition part, and the touch controller inside; a dark panel provided inside the main panel to keep an inside of the main panel in a darkroom condition; and a reflective panel provided at one side of the main panel to reflect and show the keypad hologram to the user.

According to an embodiment of the present disclosure, there is provided a hologram touch gesture control method including: projecting a keypad hologram having a plurality of key buttons in air to a first region pre-defined on the basis of a 3D coordinate system; determining a touch gesture of a user at the key button within a second region pre-defined on the basis of the 3D coordinate system; and operating an external device connected over a network, on the basis of the touch gesture at the key button.

In addition, the determining of the touch gesture may include detecting the key button corresponding to a particular point as the touch position of the user when the user's hand moves in a first direction toward the keypad hologram to make a first touch gesture at the particular point within the second region and moves in a second direction opposite to the first direction to make a second touch gesture at the particular point.

In addition, the hologram touch gesture control method may further include projecting the keypad hologram to the first region by emphasizing the key button corresponding to the particular point according to the touch position detected.

In addition, the determining of the touch gesture may include: emitting incident light perpendicular to the keypad hologram; receiving reflected light reflecting off the keypad hologram by the touch gesture of the user; and detecting the touch position of the user on the basis of the incident light and the reflected light, and determining the touch gesture of the user at the key button.

In addition, the hologram touch gesture control method may further include reporting information related to operation of the external device to the user through a notification sound when a control signal in response to the touch gesture at the key button is generated to operate the external device.

Other specifics of the present disclosure are included in the detailed description and the drawings.

According to the present disclosure, as the present disclosure is applied to a public system, such as a kiosk, an elevator, etc., requiring simple contact touch, infection caused by contact can be prevented, and a visually recognizable keypad hologram is provided for a user to use the system easily.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
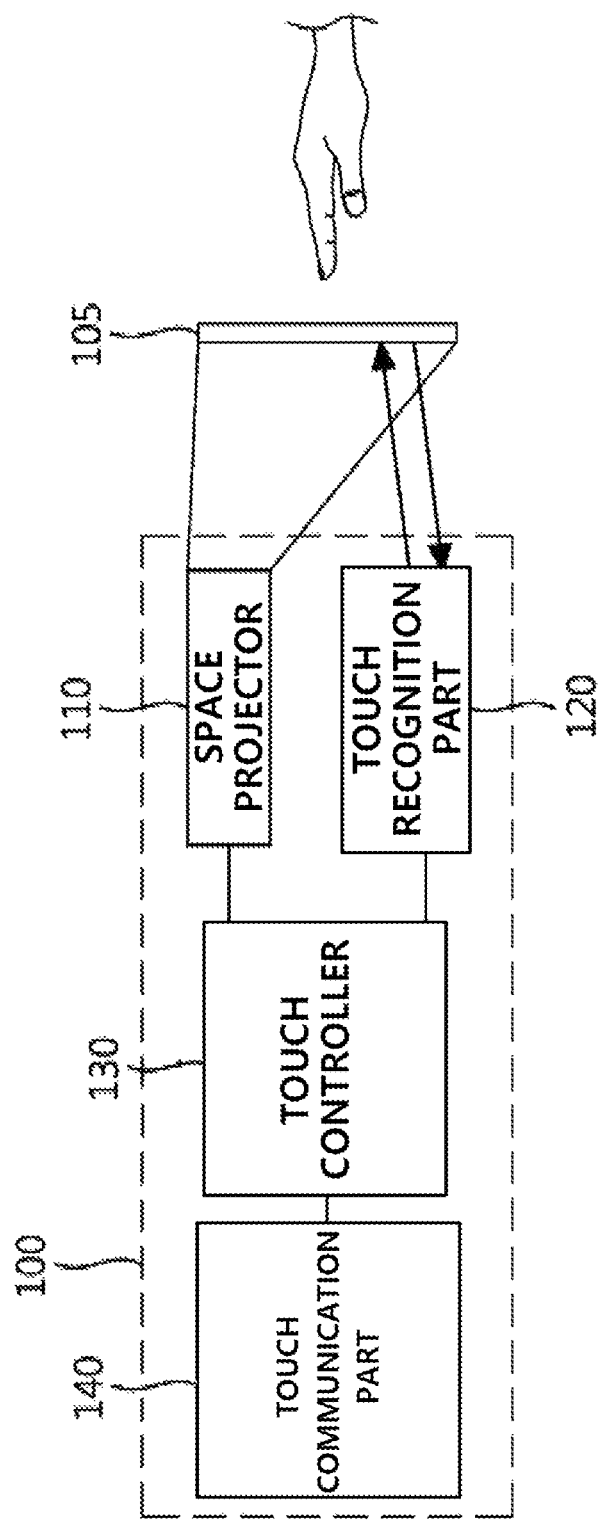
FIG. 1 is a view showing a configuration of a hologram touch display device according to an embodiment of the present disclosure.

Hereinafter, preferred embodiments of the present disclosure will be described in detail with reference to the accompanying drawings. Advantages and features of the present disclosure, and methods to achieve them will be apparent from the following embodiments that will be described in detail with reference to the accompanying drawings. It should be understood that the present disclosure is not limited to the following embodiments and may be embodied in different ways, and that the embodiments are given to provide complete the disclosure of the present disclosure and to provide a thorough understanding of the present disclosure to those skilled in the art. The scope of the present disclosure is defined only by the claims. Throughout the description, the same reference numerals refer to same elements.

It will be further understood that the terms "first", "second", etc. are used to describe various components, elements, and/or sections, but the component, elements, and/or sections are not limited by these terms. These terms are only used to distinguish one component, element, or section from another component, element, or section. Thus, a first component, a first element, or a first section discussed below could be termed a second component, a second element, or a second section without departing from the technical scope of the present disclosure.

The terms used herein are provided to describe the embodiments but not to limit the present disclosure. In the specification, the singular forms include plural forms unless particularly mentioned. It will be understood that the terms "comprises" and/or "made of" used in the specification specify the presence of stated elements, steps, operations, and/or components, but do not preclude the presence or addition of one or more other elements, steps, operations, and/or components.

Unless defined otherwise, all terms (including technical and scientific terms) used herein have the same meaning as commonly understood by those skilled in the art to which the present disclosure belongs. Further, unless explicitly defined otherwise, the terms defined in a generally-used dictionary are not ideally or excessively interpreted.

Hereinafter, the present disclosure will be described in detail with reference to the accompanying drawings.

FIG. 1 is a view showing a configuration of a hologram touch display device according to an embodiment of the present disclosure.

Referring to FIG. 1, the hologram touch display device 100 according to the embodiment of the present disclosure includes a space projector 110, a touch recognition part 120, a touch controller 130, and a touch communication part 140.

The space projector 110 projects a keypad hologram 105 having a plurality of key buttons in air. A hologram is a technology that records and reproduces three-dimensional information by using an interference phenomenon caused by two meeting beams of light. The keypad hologram 105 looks as if a keypad image is floating in air, and may cause a user to feel as if the user views a 3D keypad image.

The space projector 110 projects the keypad hologram 105 in air using a light source, such as a display component or an OLED component. The space projector 110 may project the keypad hologram 105 in various colors in space using components of different colors.

For example, the surface of the hologram touch display device 100 is provided as black glass, and the keypad hologram 105 may be projected in white in air. When a control signal for projecting the keypad hologram 105 is transmitted, the space projector 110 displays the keypad hologram 105 in the space a predetermined distance away from one surface of the hologram touch display device 100.

In particular, the space projector 110 may project the keypad hologram 105 to a first region pre-defined on the basis of a 3D coordinate system. The user may provide input with key buttons by touching his or her finger to a desired position in the keypad hologram 105 projected to the first region pre-defined. For example, to move to a desired place in a building, a user may position his or her finger at a key button of the keypad hologram 105 corresponding to an elevator button.

The touch recognition part 120 emits light to the keypad hologram 105, receives the light reflected by the user's touch gesture at the keypad hologram 105 to detect the user's touch position with respect to the keypad hologram 105, and determines keypad touch information of the user according to the touch position.

That is, when the user positions his or her finger to the keypad hologram 105 of the desired key button, the light at a particular position reflecting off the finger is detected to sense the touch position of the finger, thereby determining the keypad touch information of the user.

In addition, the touch recognition part 120 determines the keypad touch information by detecting the touch position based on the user's touch gesture within a second region pre-defined on the basis of the 3D coordinate system corresponding to the plurality of key buttons.

More specifically, when the user's hand moves in a first direction toward the keypad hologram 105 to make a first touch gesture at a particular point within the second region and moves in a second direction opposite to the first direction to make a second touch gesture at the particular point, the touch recognition part 120 detects the key button corresponding to the particular point as the user's touch position and determines the keypad touch information.

That is, with respect to a virtual plane on which the keypad hologram 105 is created, a particular point at which the user's finger moves back and forth and touches the virtual plane twice is recognized as the keypad touch information, and in response to the key button of the keypad hologram 105 corresponding to the point, a device is operated.

Herein, the touch controller 130 may control the space projector 110 such that the key button corresponding to a particular point determined as the keypad touch information is displayed in an emphasized manner.

For example, a key button corresponding to a particular point determined as keypad touch information may be displayed enlarged. Alternatively, the contour surface of a key button corresponding to a particular point determined as keypad touch information may be emphasized in a different color. Alternatively, a key button corresponding to a particular point determined as keypad touch information may be displayed in a flickering manner.

The touch controller 130 performs control such that an external device (not shown) connected over a network operates on the basis of the keypad touch information of the touch recognition part 120. Herein, the network may include a wired/wireless network.

The wired network may use standard RS-485 or RS232C to connect the hologram touch display device 100 to an external device, such as an ATM, an elevator, a door lock, etc.

As the wireless network, Bluetooth, Zigbee, Near Field Communication (NFC), or Wibree may be used. For example, Bluetooth is one of short-range wireless communication standards. Bluetooth is for connecting and controlling various electronic and information communication devices in a wireless manner within a radius of 10 to 100 m, and uses a frequency of 2.45 GHz. Wibree uses a frequency of 2.4 GHz band, and is for connecting and controlling various devices in a wireless manner at the transmission rate of 1 Mbps at a distance of up to 10 m. It is obvious for those skilled in the art that limitation to the short-range wireless communications is not imposed, other wireless communication schemes may be adopted.

The touch communication part 140 communicates with an external device, and may communicate using RS-485. In addition, the touch controller 130 generates a control signal according to keypad touch information, and transmits the control signal to an external device through the touch communication part 140.

The touch controller 130 controls the space projector 110, the touch recognition part 120, and the touch communication part 140.

Figure 2A:
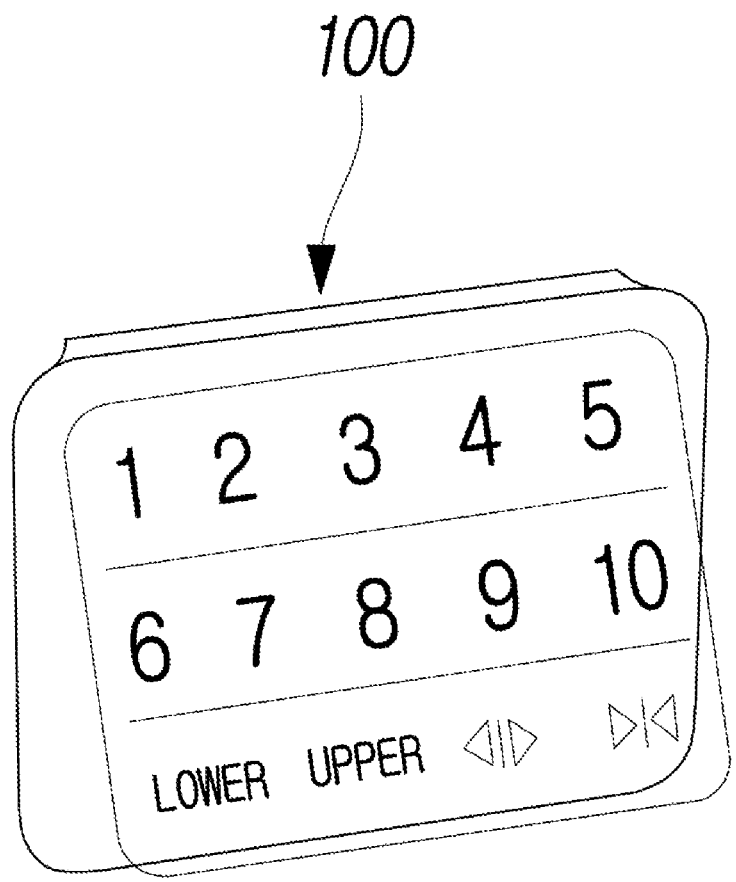
FIG. 2A is a front view showing the appearance of a hologram touch display device according to an embodiment of the present disclosure.
Figure 2B:
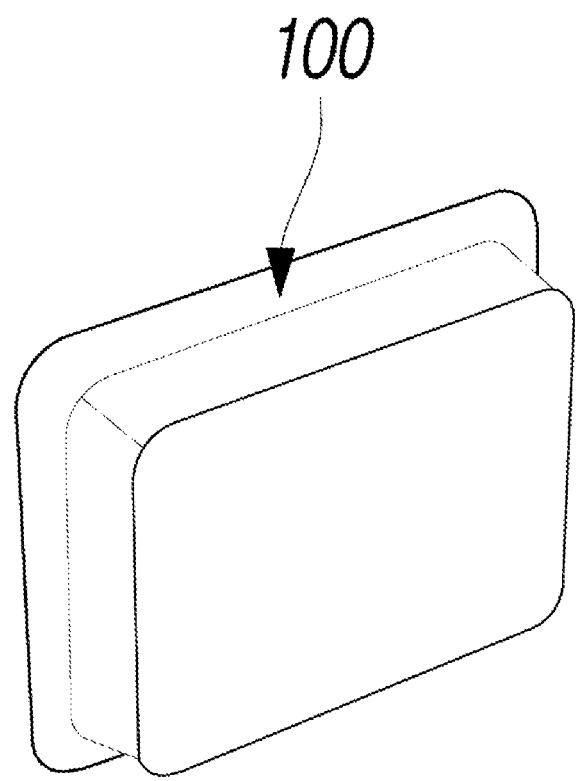
FIG. 2b is a rear view showing the appearance.
Figure 2C:
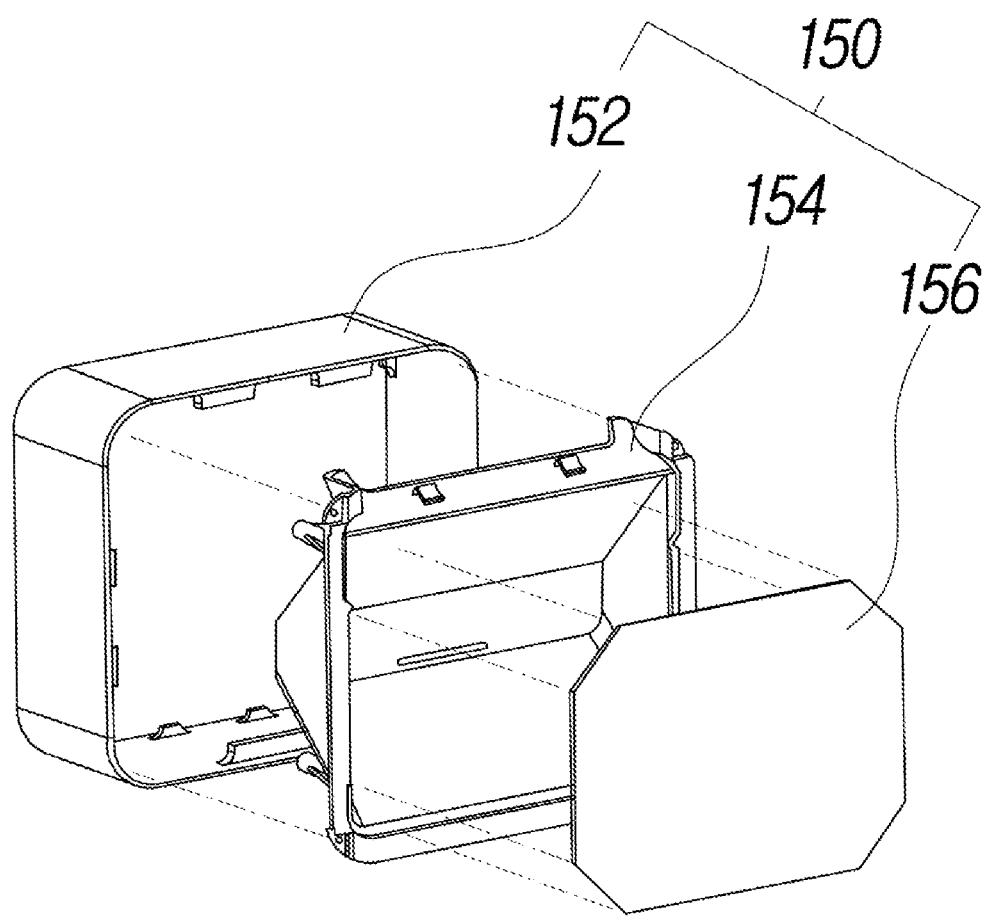
FIG. 2C is an exploded view showing elements constituting the appearance.

FIG. 2A is a front view showing the appearance of a hologram touch display device according to an embodiment of the present disclosure, FIG. 2b is a rear view showing the appearance, and FIG. 2C is an exploded view showing elements constituting the appearance.

Referring to FIGS. 2A to 2C, the hologram touch display device 100 projects a hologram into the air ahead, and further includes a housing 150 for arranging the space projector 110, the touch recognition part 120, and the touch controller 130.

More specifically, the housing 150 may include a main panel 152, a dark panel 154, and a reflective panel 156. The main panel 152 is for arranging the space projector 110, the touch recognition part 120, and the touch controller 130 inside. The dark panel 154 is provided inside the main panel 152 to keep the inside of the main panel 152 in a darkroom condition. The reflective panel 156 is provided at one side of the main panel 152 to reflect and show the keypad hologram 105 to the user. Herein, one surface of the dark panel 154 may be formed in the shape of a gable protruding in a direction opposite to the direction of the reflective panel 156.

In addition, although not shown in the drawings, the hologram touch display device 100 may further include a proximity sensor (not shown) to recognize the user approaching the hologram touch display device 100.

The proximity sensor recognizes the user's approach and the keypad hologram 105 is projected only when the user approaches, so that the keypad hologram 105 is prevented from being always projected ahead of an external device.

Figure 3A:
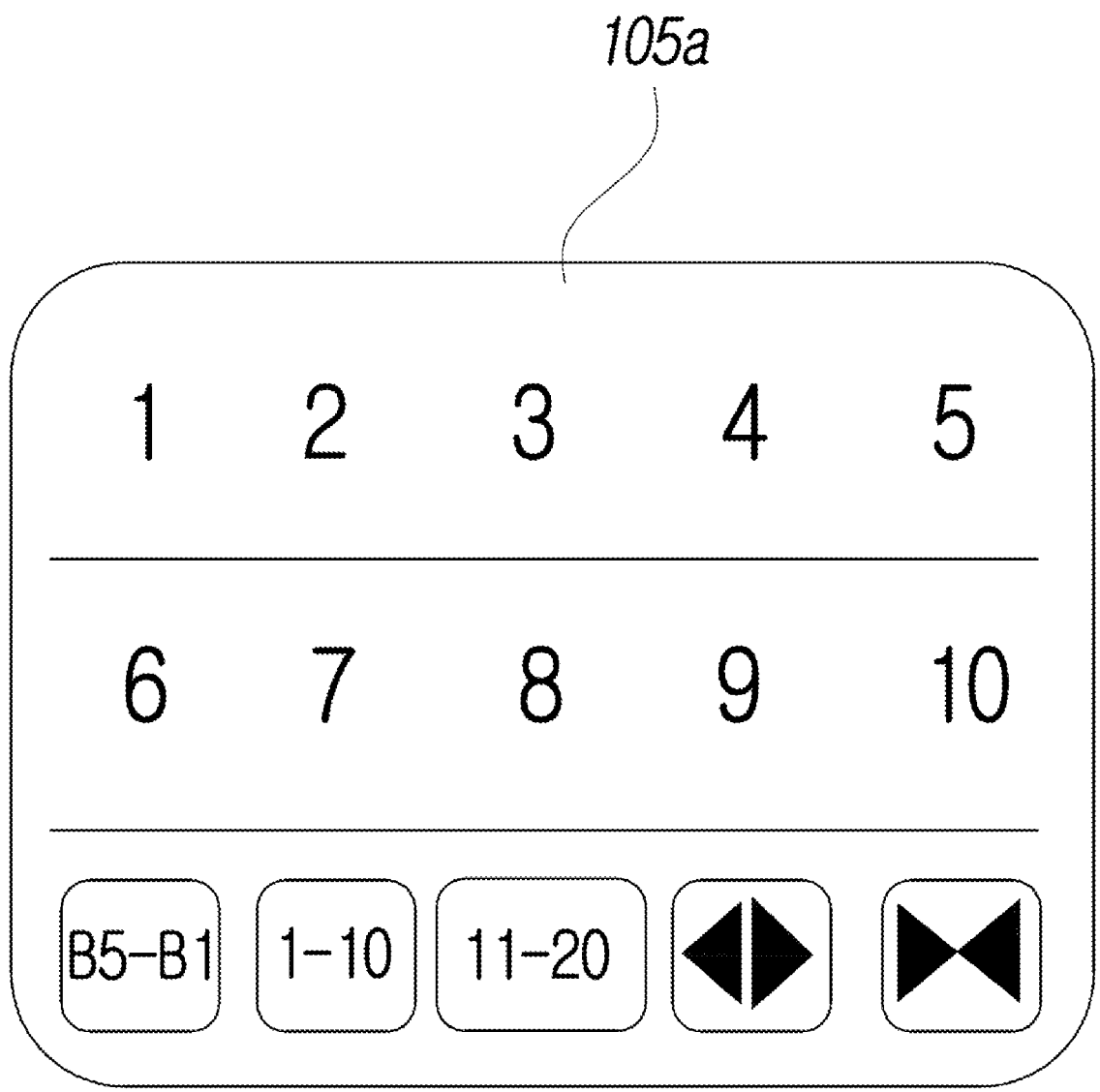
FIGS. 3A to 3C are views showing examples of a keypad hologram, respectively.
Figure 3B:
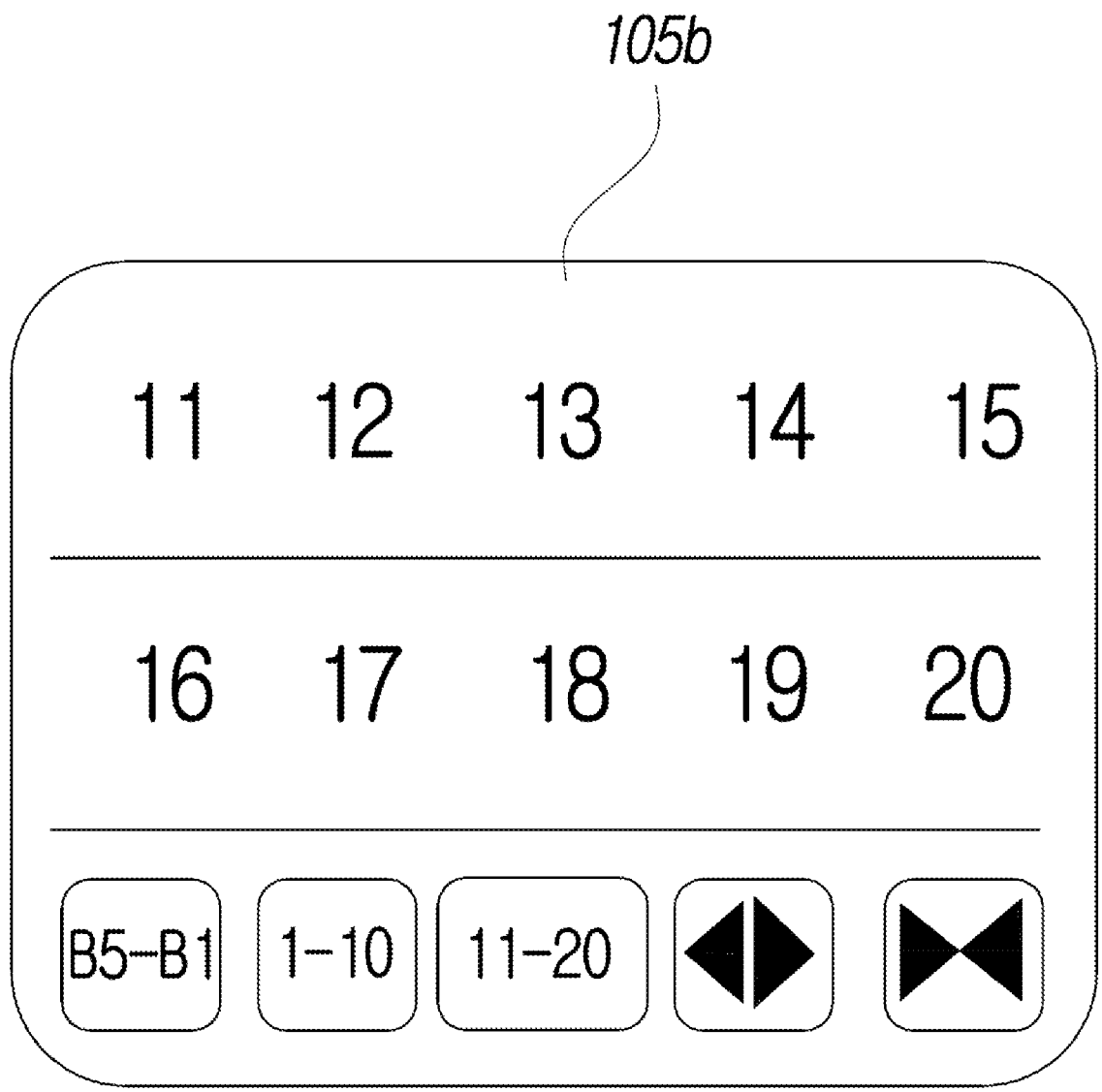
Figure 3C:
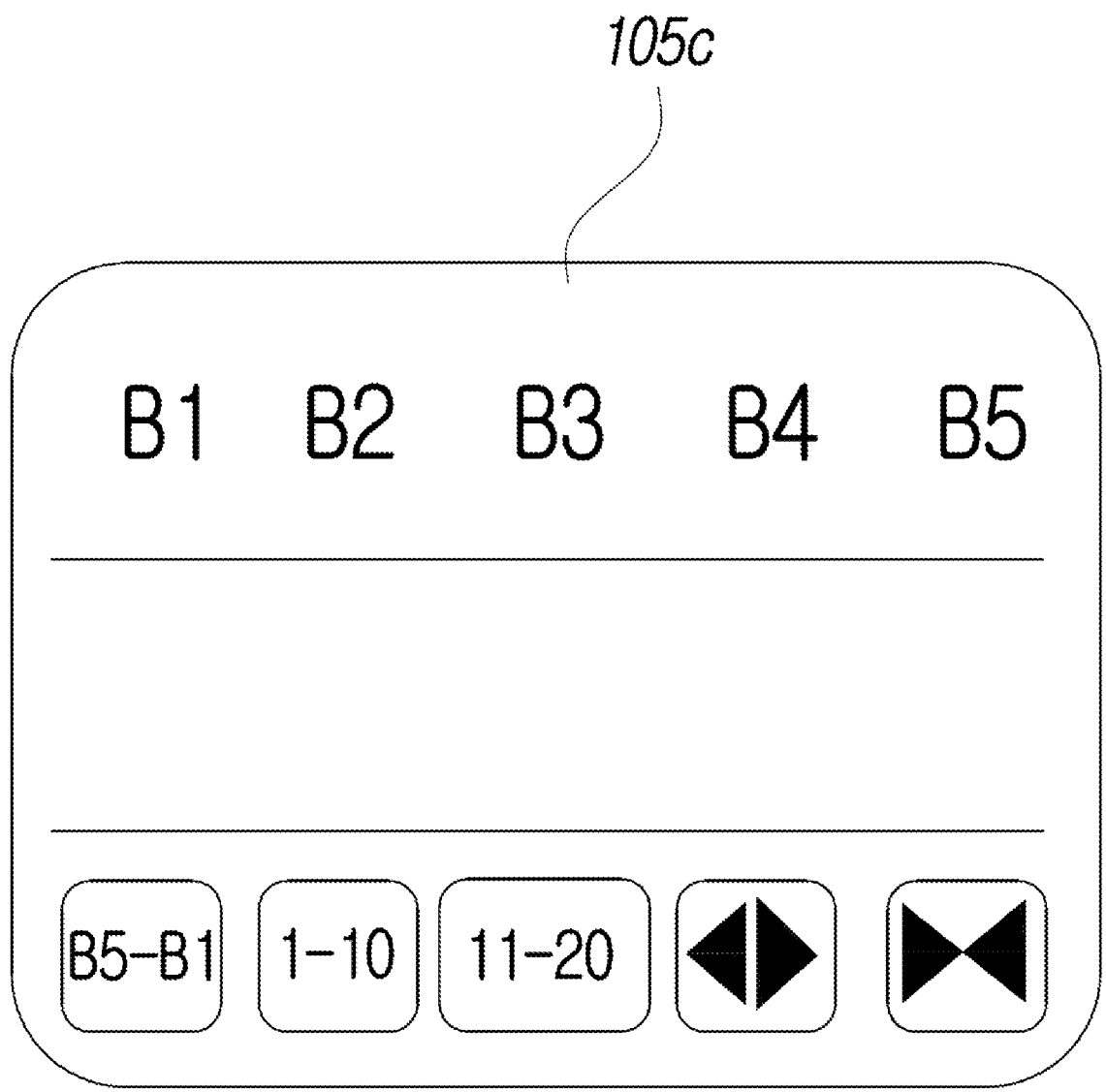

FIGS. 3A to 3C are views showing examples of a keypad hologram, respectively.

As shown in FIGS. 3A to 3C, to operate an elevator, elevator keypad holograms 105a, 105b, and 105c may include various shapes of key buttons. These hologram touch key buttons may be realized in various designs in accordance with an external device.

Figure 4:
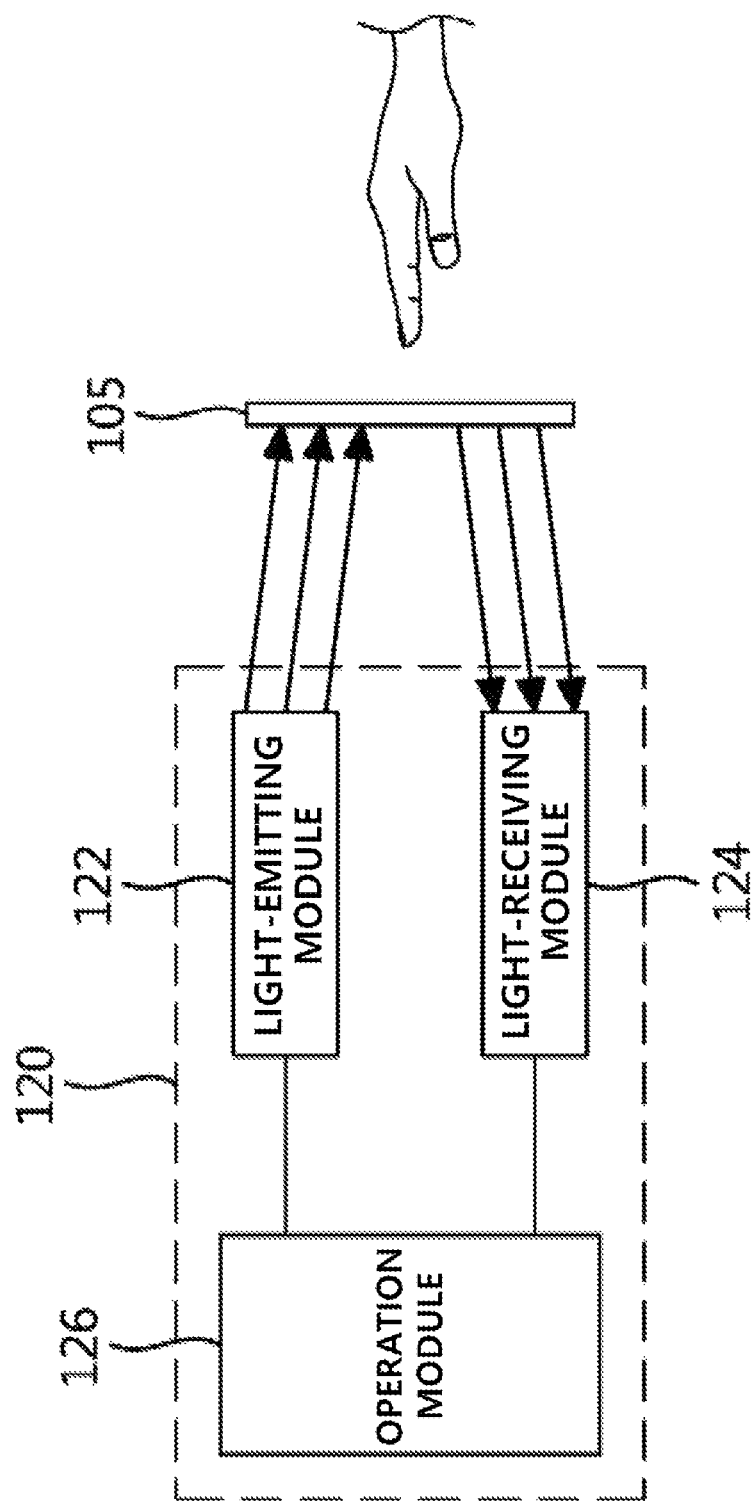
FIG. 4 is a view showing a detailed configuration of a touch recognition part of a hologram touch display device according to an embodiment of the present disclosure.
Figure 5:
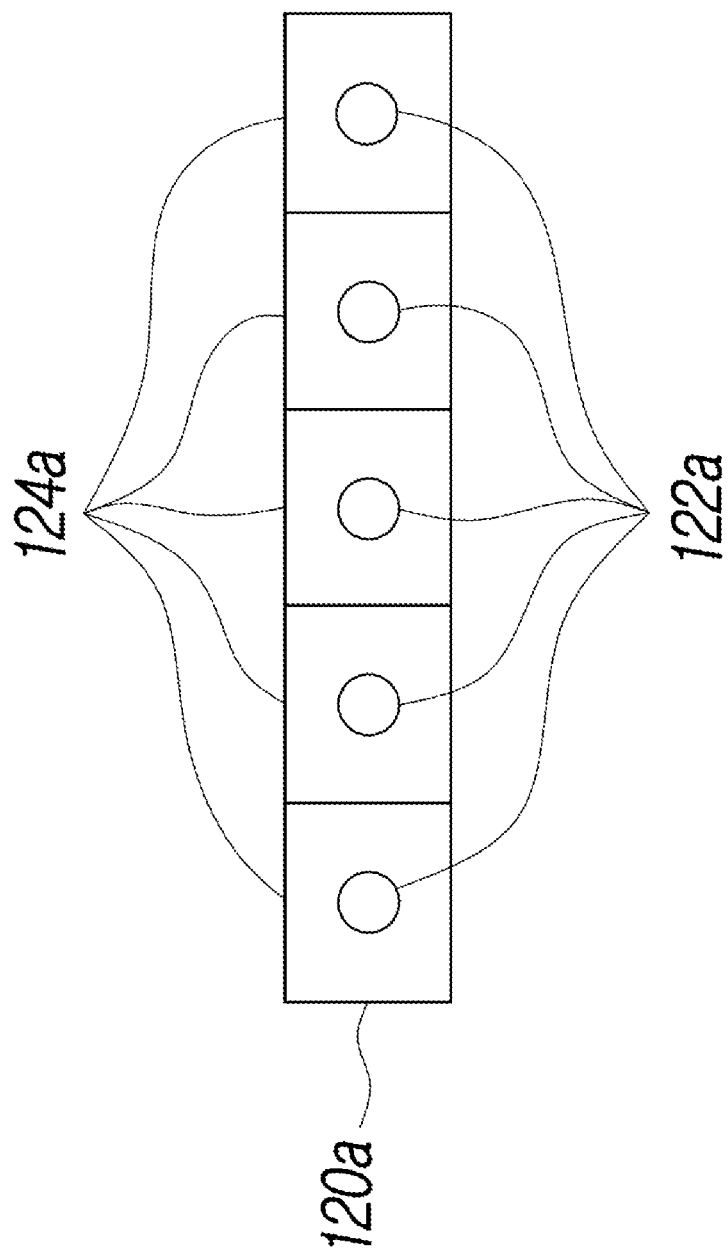
FIG. 5 is a view showing a sensor array in which a light-emitting module and a light-receiving module of the touch recognition part of FIG. 4 are integrated.

FIG. 4 is a view showing a detailed configuration of a touch recognition part of a hologram touch display device according to an embodiment of the present disclosure. In addition, FIG. 5 is a view showing a sensor array in which a light-emitting module and a light-receiving module of the touch recognition part of FIG. 4 are integrated.

Referring to FIG. 4, the touch recognition part 120 may include a light-emitting module 122, a light-receiving module 124, and an operation module 126. The light-emitting module 122 emits incident light perpendicular to the keypad hologram 105. The light-receiving module 124 receives reflected light reflecting off the keypad hologram 105 by the user's touch gesture. The operation module 126 detects a touch position of the user on the basis of the incident light and the reflected light, and computes keypad touch information.

The light-emitting module 122 emits light to detect the user's touch, and may generate an independent optical signal corresponding to each key button of the keypad hologram 105.

The light-receiving module 124 receives the reflected light generated by the user touching a key button of the keypad hologram 105 projected in air, and transmits the reflected light to the operation module 126.

The operation module 126 uses the incident light of the light-emitting module 122 and the reflected light of the light-receiving module 124 to detect the difference therebetween, and detects the key button of the keypad hologram 105 touched by the user on the basis of the difference.

In order to accurately detect the key button of the keypad hologram 105 touched by the user, the light-emitting module 122 and the light-receiving module 124 may be integrated corresponding to each other.

Referring to FIG. 5, the light-emitting module 122 of the touch recognition part 120 include a plurality of light emitters 122a, and the light-receiving module 124 includes a plurality of light receivers 124a. A sensor array 120a is included in which unit sensor modules each composed of one light emitter and one light receiver are arranged corresponding to a plurality of key buttons.

The light-emitting module 122 includes the plurality of light emitters 122a corresponding to the number of key buttons of the keypad hologram 105, and the light emitted from the plurality of light emitters 122a is emitted perpendicularly to the keypad hologram 105.

The light-receiving module 124 includes the plurality of light receivers 124a one-to-one corresponding to the plurality of light emitters 122a. Accordingly, a change in the intensity of the light emitted perpendicularly to the keypad hologram 105 from the light-emitting module 122 may be accurately recognized through the plurality of light receivers 124a.

One light emitter 122a and one light receiver 124a constitute a unit sensor module, and the unit sensor modules constitute the sensor array 120a. Herein, regarding each unit sensor module, the light emitter 122a is provided in the front center of the light receiver 124a, and the light emitted from the light emitter 122a and reflecting off the keypad hologram 105 reflects to the light receiver 124a.

One light emitter 122a and one light receiver 124a constitute a unit sensor module, and thus when several key buttons are simultaneously touched, this is immediately recognized, or when several key buttons are sequentially touched, it is quickly recognized that the key buttons are sequentially input.

Figure 6:
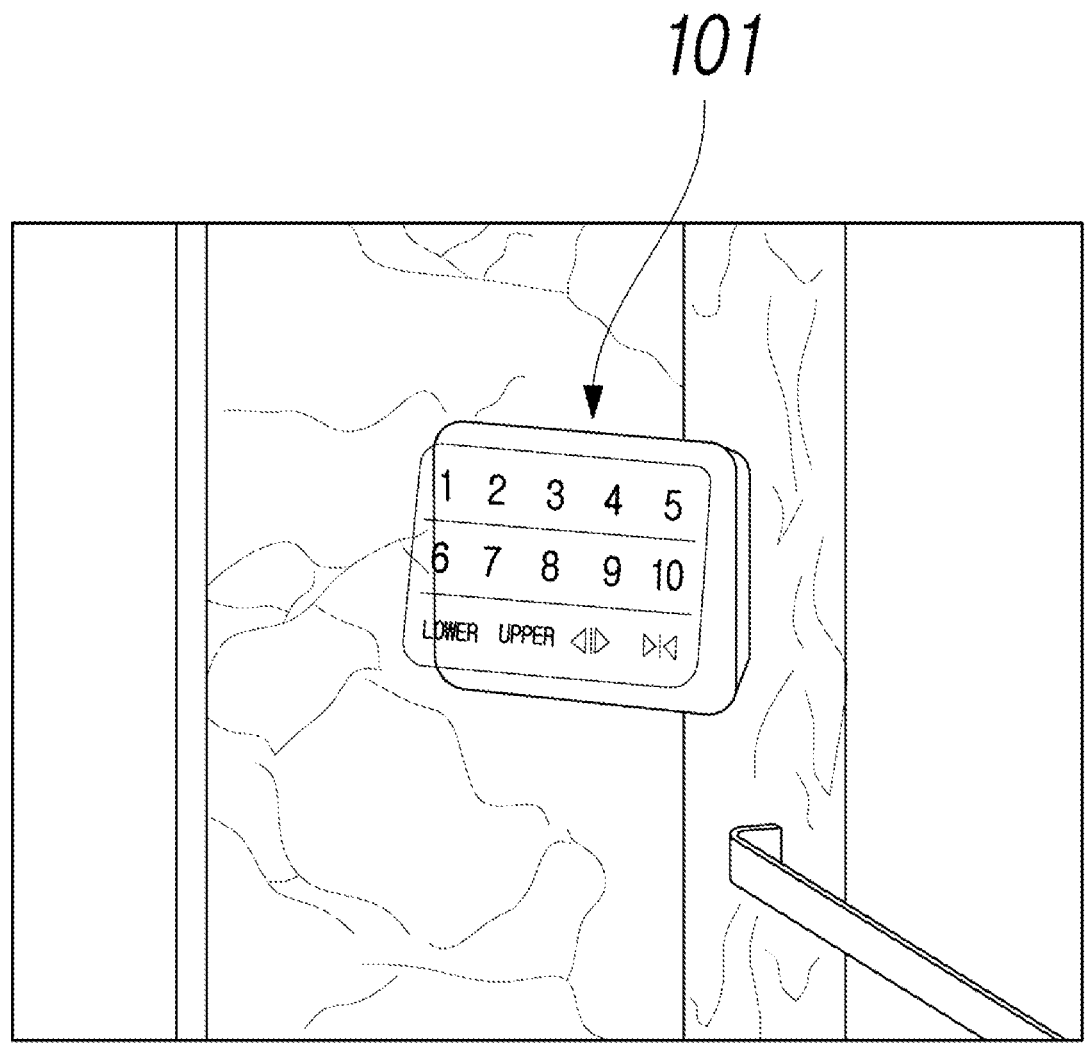
FIG. 6 is a view showing the appearance of a hologram touch display device according to another embodiment of the present disclosure.

FIG. 6 is a view showing the appearance of a hologram touch display device according to another embodiment of the present disclosure.

Referring to FIG. 6, the hologram touch display device 101 according to the embodiment of the present disclosure is installed at a corner where a wall and a wall meet. A keypad hologram 105 has a limited viewing angle, and when the hologram touch display device 101 is installed at a corner where walls meet, it is difficult to recognize which key button of the keypad hologram 105 is touched by another user. Accordingly, other people are unable to recognize the touch key button of the user touching the keypad hologram 105, thereby protecting the user's privacy.

The hologram touch display device described above may be designed to have various appearances according to an external device linked thereto, installation location, and installation purpose.

Figure 7:
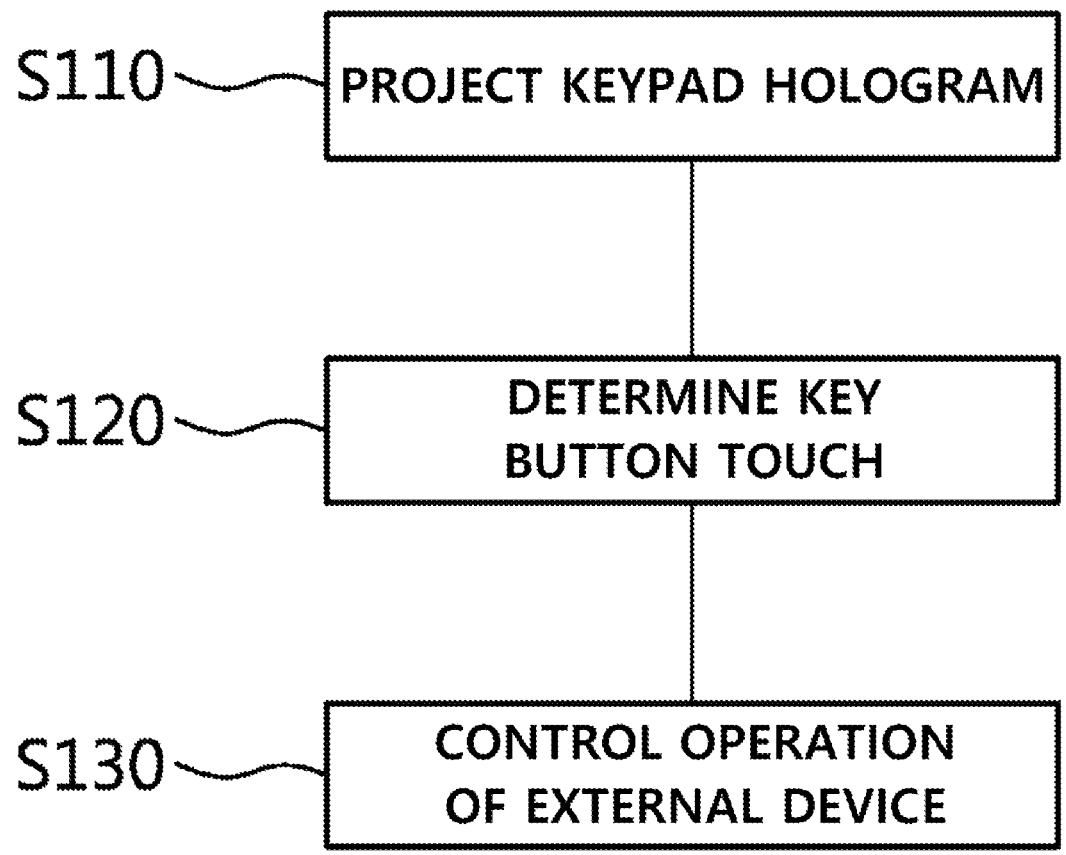
FIG. 7 is a flowchart showing a hologram touch gesture control method according to an embodiment of the present disclosure.

FIG. 7 is a flowchart showing a hologram touch gesture control method according to an embodiment of the present disclosure.

Referring to FIG. 7, in the hologram touch gesture control method according to the embodiment of the present disclosure, a keypad hologram having a plurality of key buttons is projected in air to a first region pre-defined on the basis of a 3D coordinate system in step S110, a touch gesture of the user at the key button within a second region pre-defined on the basis of the 3D coordinate system is determined in step S120, and an external device connected over a network is operated on the basis of the touch gesture at the key button in step S130.

Herein, in determining the touch gesture, when the user's hand moves in a first direction toward the keypad hologram to make a first touch gesture at a particular point within the second region and moves in a second direction opposite to the first direction to make a second touch gesture at the particular point, the key button corresponding to the particular point may be detected as the user's touch position.

Herein, the keypad hologram may be projected to the first region by emphasizing the key button corresponding to the particular point according to the detected touch position. For example, the key button may be projected flickered, the contour of the key button may be projected in a different color, or the key button may be projected enlarged.

In addition, in determining the touch gesture, incident light may be emitted perpendicular to the keypad hologram, the reflected light reflecting off the keypad hologram by the user's touch gesture may be received, the user's touch position may be detected on the basis of the incident light and the reflected light, and the touch gesture of the user at the key button may be determined.

In addition, when a control signal in response to the touch gesture at the key button is generated to operate an external device, information related to the operation of the external device may be reported to the user through a notification sound. For example, when a key button of the keypad hologram is touched, the contents capable of reporting information of the key button may be notified to the user by sound.

Figure 8:
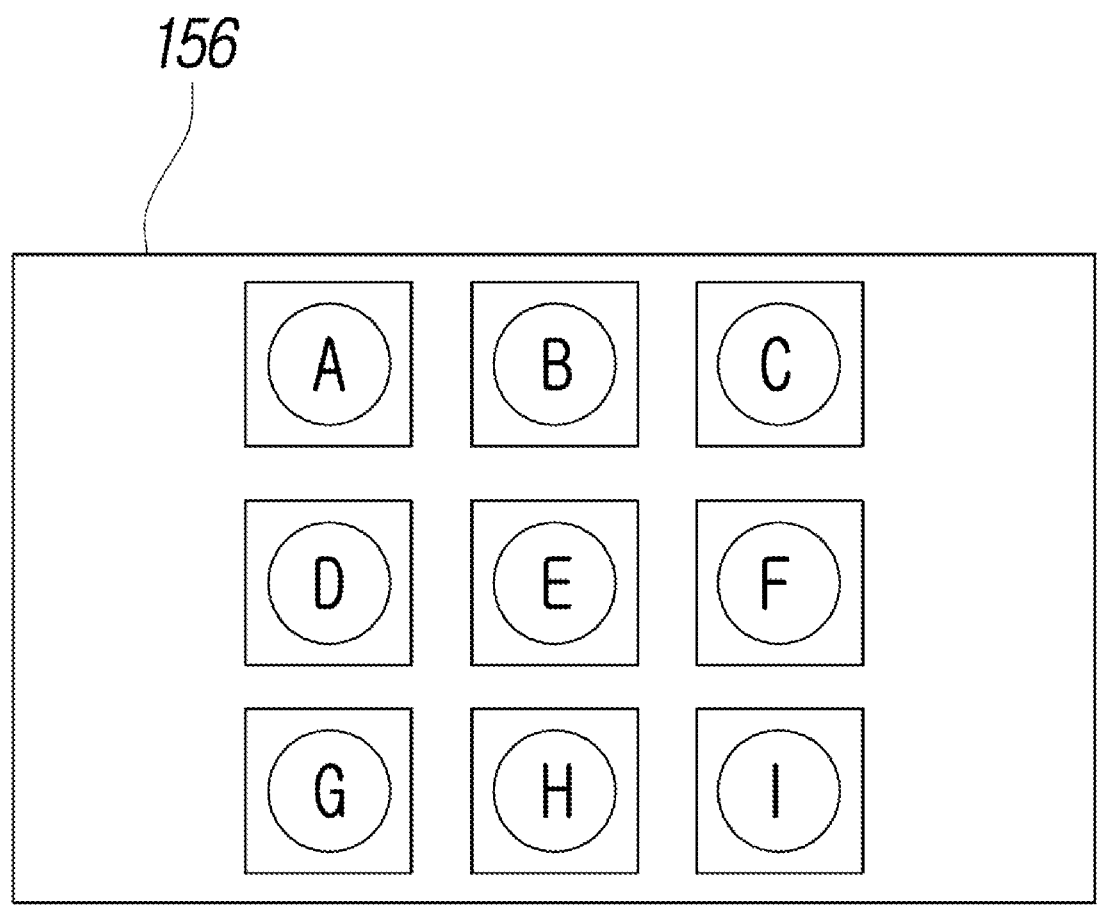
FIG. 8 is a view showing a section set in a reflective panel to measure display luminance of a hologram touch display device.

FIG. 8 is a view showing a section set in a reflective panel to measure display luminance of a hologram touch display device.

By measuring the luminance of light penetrating through the reflective panel 156 from a light source (not shown) located inside the hologram touch display device, an appropriate projection position of a hologram may be considered.

Referring to FIG. 8, nine regions A to I were set in the reflective panel 156, and the luminance of light penetrating through the reflective panel 156 was measured. Herein, glasses respectively having the light blocking percentages of the reflective panels 156 of 30% and 60% were used, the display brightnesses were 582 cd/m2 (50%) and 1.084 kcd/m2 (100%), and the luminance was measured 10 times and the average was computed.

At the angles of 20, 30, and 45 degrees with respect to the holograms penetrating through the reflective panels 156 and projected in the air, the respective luminance values are shown in Table 1, 2, and 3 below.

TABLE 1

| Light source luminance | Light blocking percentage | Luminance by section (cd/m2) | | |
|---|---|---|---|---|
| 582 cd/m2 | 30% | 128.8 | 128.0 | 128.1 |
| | | 137.3 | 137.7 | 136.5 |
| | | 144.6 | 143.3 | 143.2 |
| | 60% | 44.4 | 44.7 | 44.8 |
| | | 47.7 | 48.1 | 47.8 |
| | | 50.7 | 50.8 | 50.3 |
| 1084 cd/m2 | 30% | 242.9 | 239.7 | 238.4 |
| | | 256.5 | 258.6 | 256.5 |
| | | 272.6 | 270.0 | 268.7 |
| | 60% | 83.5 | 84.3 | 84.7 |
| | | 89.3 | 90.2 | 89.6 |
| | | 91.0 | 90.6 | 91.8 |

TABLE 2

| Light source luminance | Light blocking percentage | Luminance by section (cd/m2) | | |
|---|---|---|---|---|
| 582 cd/m2 | 30% | 83.4 | 83.0 | 82.4 |
| | | 88.2 | 88.1 | 86.2 |
| | | 68.3 | 67.1 | 74.0 |
| | 60% | 27.8 | 27.9 | 27.8 |
| | | 29.3 | 29.6 | 29.4 |
| | | 21.1 | 21.0 | 22.3 |
| 1084 cd/m2 | 30% | 155.7 | 155.2 | 152.5 |
| | | 164.5 | 165.4 | 163.8 |
| | | 124.2 | 125.8 | 128.8 |
| | 60% | 52.7 | 53.4 | 53.0 |
| | | 56.1 | 56.4 | 55.8 |
| | | 36.4 | 34.0 | 39.3 |

TABLE 3

| Light source luminance | Light blocking percentage | Luminance by section (cd/m2) | | |
|---|---|---|---|---|
| 582 cd/m2 | 30% | 42.2 | 41.8 | 41.9 |
| | | 45.9 | 46.0 | 46.0 |
| | | 0.6 | 0.8 | 0.9 |
| | 60% | 12.2 | 12.5 | 12.4 |
| | | 13.6 | 13.7 | 13.7 |
| | | 0.0 | 0.0 | 0.0 |
| 1084 cd/m2 | 30% | 79.2 | 79.4 | 79.2 |
| | | 84.9 | 84.0 | 83.1 |
| | | 3.1 | 3.4 | 3.0 |
| | 60% | 24.4 | 24.9 | 24.5 |
| | | 26.9 | 27.2 | 27.2 |
| | | 0.0 | 0.0 | 0.0 |

In Tables 1 to 3 above, the cells for the luminance by section show the average values of the luminance values corresponding to regions A to I shown in FIG. 8 measured 10 times.

In Table 1, as it goes from regions A, B, and C to regions G, H, and I, the luminance value increases, but in Tables 2 and 3, the luminance value increases and then decreases. It is preferable that the angle between the hologram and the device is less than a 30 degree angle. In addition, in order to prevent direct contact with the reflective panel 156 when the hologram in the air is touched, it is preferable that the angle is equal to or greater than a 20 degree angle. The optimum value of the angle may be set to a 20 degree angle, and the hologram may be projected at the angle of 20 degrees or more and less than 30 degrees from the glass provided ahead of the hologram touch display device 100.

Exemplary embodiments of the present disclosure have been described with reference to the accompanying drawings, but it will be understood by a person skilled in the art to which the present disclosure pertains that the present disclosure may be implemented in other specific forms without modifying the technical spirit or essential feature of the present disclosure. Therefore, it should be understood that the aforementioned exemplary embodiments are illustrative in terms of all aspects and are not limited.

What is claimed is:

1. A hologram touch display device, comprising:
a space projector configured to project a keypad hologram having a plurality of key buttons in air;
a touch recognition part configured to emit light to the keypad hologram, receive the light reflected by a touch gesture of a user at the keypad hologram to detect a touch position of the user with respect to the keypad hologram, and determine keypad touch information of the user according to the touch position;
a touch controller configured to perform control such that an external device connected over a network operates on the basis of the keypad touch information; and
a housing for arranging the space projector, the touch recognition part, and the touch controller,
wherein the housing comprises:
a main panel for arranging the space projector, the touch recognition part, and the touch controller inside;
a dark panel provided inside the main panel to keep an inside of the main panel in a darkroom condition, so that the space projector, the touch recognition part, and the touch controller are disposed in the darkroom condition; and
a reflective panel having a flat surface and provided at one side of the main panel to make the dark panel disposed between the main panel and the reflective panel, and configured to reflect the keypad hologram projected from the space projector to directly show the keypad hologram to the user,
wherein one surface of the dark panel is provided in a shape of a gable protruding in a direction opposite to a direction of the reflective panel,
wherein based on the flat surface of the reflective panel and the shape of the gable of the dark panel, there is an angle between the keypad hologram and the reflective panel, and the angle is in a range of 20 degrees or more and less than 30 degrees.

2. The hologram touch display device of claim 1, wherein the space projector is configured to project the keypad hologram to a first region pre-defined on the basis of a 3D coordinate system.

3. The hologram touch display device of claim 2, wherein the touch recognition part is configured to determine the keypad touch information by detecting the touch position based on the touch gesture of the user within a second region pre-defined on the basis of the 3D coordinate system corresponding to the plurality of key buttons.

4. The hologram touch display device of claim 3, wherein when the user's hand moves in a first direction toward the keypad hologram to make a first touch gesture at a particular point within the second region and moves in a second direction opposite to the first direction to make a second touch gesture at the particular point, the touch recognition part is configured to detect the key button corresponding to the particular point as the touch position of the user and determine the keypad touch information, and the touch controller is configured to control the space projector such that the key button corresponding to the particular point determined as the keypad touch information is displayed in an emphasized manner.

5. The hologram touch display device of claim 1, wherein the touch recognition part comprises:
- a light-emitting module configured to emit incident light perpendicular to the keypad hologram;
- a light-receiving module configured to receive reflected light reflecting off the keypad hologram by the touch gesture of the user; and
- an operation module configured to detect the touch position of the user on the basis of the incident light and the reflected light, and compute the keypad touch information.

6. The hologram touch display device of claim 5, wherein the touch recognition part comprises:
- the light-emitting module comprising a plurality of light emitters, and the light-receiving module comprising a plurality of light receivers; and a sensor array in which unit sensor modules each composed of one of the light emitters and one of the light receivers are arranged corresponding to the plurality of key buttons.

7. The hologram touch display device of claim 1, further comprising a touch communication part configured to communicate with the external device.

8. The hologram touch display device of claim 7, wherein the touch controller is configured to generate a control signal according to the keypad touch information and transmit the control signal to the external device through the touch communication part.

* * * * *